(12) United States Patent
Yi et al.

(10) Patent No.: US 10,111,151 B2
(45) Date of Patent: Oct. 23, 2018

(54) METHOD AND APPARATUS FOR ESTABLISHING GROUP CELL ON BASIS OF MEASUREMENT SIGNAL VARIATION

(71) Applicants: LG ELECTRONICS INC., Seoul (KR); KOREA ADVANCED INSTITUTE OF SCIENCE AND TECHNOLOGY, Daejeon (KR)

(72) Inventors: Yunjung Yi, Seoul (KR); Hansung Leem, Daejeon (KR); Dan Keun Sung, Daejeon (KR); JaYeong Kim, Daejeon (KR); Byounghoon Kim, Seoul (KR)

(73) Assignees: LG ELECTRONICS INC., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 139 days.

(21) Appl. No.: 15/530,194

(22) PCT Filed: Jun. 8, 2015

(86) PCT No.: PCT/KR2015/005735
§ 371 (c)(1),
(2) Date: Dec. 8, 2016

(87) PCT Pub. No.: WO2015/190784
PCT Pub. Date: Dec. 17, 2015

(65) Prior Publication Data
US 2017/0181051 A1    Jun. 22, 2017

Related U.S. Application Data

(60) Provisional application No. 62/009,307, filed on Jun. 8, 2014.

(51) Int. Cl.
*H04W 36/30*     (2009.01)
*H04W 24/10*     (2009.01)
(Continued)

(52) U.S. Cl.
CPC ............ *H04W 36/30* (2013.01); *H04B 7/024* (2013.01); *H04W 24/10* (2013.01);
(Continued)

(58) Field of Classification Search
CPC . H04W 36/30; H04W 36/0083; H04W 36/38; H04W 36/32; H04W 24/10; H04W 84/045; H04B 7/024
See application file for complete search history.

(56) References Cited

U.S. PATENT DOCUMENTS

2007/0037584 A1\* 2/2007 Um ....................... H04W 36/18
455/456.1
2011/0281585 A1\* 11/2011 Kwon ................... H04L 1/0002
455/436
(Continued)

FOREIGN PATENT DOCUMENTS

| KR | 1020100088512 | 8/2010 |
|---|---|---|
| KR | 1020120060627 | 6/2012 |
| KR | 1020120127721 | 11/2012 |

OTHER PUBLICATIONS

PCT International Application No. PCT/KR2015/005735, International Search Report dated Sep. 15, 2015, 2 pages.
(Continued)

*Primary Examiner* — Ian N Moore
*Assistant Examiner* — Brian T Le
(74) *Attorney, Agent, or Firm* — Lee, Hong, Degerman, Kang & Waimey

(57) ABSTRACT

The present specification suggests a method for establishing a terminal-centric group cell on the basis of measurement signal variation for cooperative transmission and handover in a mobile communication system. Specifically, a base station receives transmissions of parameters from a terminal, configures a terminal surrounding cell information table, and configures a cooperative cell cluster configuration table (Continued)

using the terminal surrounding cell information table as the terminal moves. The base station performs cooperative transmission and handover using the cooperative cell cluster configuration table. The terminal sends parameters to the base station periodically or when a certain condition is met, and the base station updates the terminal surrounding cell information table and the cooperative cell cluster configuration table using the parameters sent from the terminal to thereby use the same for mobility management.

14 Claims, 18 Drawing Sheets

(51) Int. Cl.
*H04W 36/38* (2009.01)
*H04B 7/024* (2017.01)
*H04W 36/00* (2009.01)
*H04W 36/32* (2009.01)
*H04W 84/04* (2009.01)

(52) U.S. Cl.
CPC ....... *H04W 36/0083* (2013.01); *H04W 36/38* (2013.01); *H04W 36/32* (2013.01); *H04W 84/045* (2013.01)

(56) References Cited

U.S. PATENT DOCUMENTS

2012/0033624 A1 2/2012 Luo et al.
2014/0153508 A1 6/2014 Lee et al.

OTHER PUBLICATIONS

3rd Generation Partnership Project (3GPP), "Technical Specification Group Radio Access Network; Evolved Universal Terrestrial Radio Access (E-UTRA); User Equipment (UE) procedures in idle mode (Release 8)," 3GPP TS 36.304 V8.5.0, Mar. 2009, 30 pages.

* cited by examiner

FIG. 11

| Anchor Cell | RSSI | $\Delta distance_{1,2}$ | $\Delta distance_{2,3}$ |
|---|---|---|---|
| 1 | $R_{1,avg}$ of Cell 1 | $\Delta r_{1,2}$ of Cell 1 | $\Delta r_{2,3}$ of Cell 1 |
| Cell # (RSSI size order) | RSSI | $\Delta distance_{1,2}$ | $\Delta distance_{2,3}$ |
| 1 | $R_{1,avg}$ of Cell 1 | $\Delta r_{1,2}$ of Cell 1 | $\Delta r_{2,3}$ of Cell 1 |
| 5 | $R_{1,avg}$ of Cell 5 | $\Delta r_{1,2}$ of Cell 5 | $\Delta r_{2,3}$ of Cell 5 |
| 4 | $R_{1,avg}$ of Cell 4 | $\Delta r_{1,2}$ of Cell 4 | $\Delta r_{2,3}$ of Cell 4 |
| Cell # ($\Delta distance_{1,2}$ size order) | RSSI | $\Delta distance_{1,2}$ | $\Delta distance_{2,3}$ |
| 5 | $R_{1,avg}$ of Cell 5 | $\Delta r_{1,2}$ of Cell 5 | $\Delta r_{2,3}$ of Cell 5 |
| 9 | $R_{1,avg}$ of Cell 9 | $\Delta r_{1,2}$ of Cell 9 | $\Delta r_{2,3}$ of Cell 9 |
| 8 | $R_{1,avg}$ of Cell 8 | $\Delta r_{1,2}$ of Cell 8 | $\Delta r_{2,3}$ of Cell 8 |

FIG. 12

| | Cell # | RSSI | Δdistance$_{1,2}$ | Δdistance$_{2,3}$ |
|---|---|---|---|---|
| Anchor cell | 1 | R$_{1,avg}$ of Cell 1 | Δr$_{1,2}$ of Cell 1 | Δr$_{2,3}$ of Cell 1 |
| Neighbor cell | 5 | R$_{1,avg}$ of Cell 5 | Δr$_{1,2}$ of Cell 5 | Δr$_{2,3}$ of Cell 5 |
| Handover candidate cell | 9 | R$_{1,avg}$ of Cell 9 | Δr$_{1,2}$ of Cell 9 | Δr$_{2,3}$ of Cell 9 |

METHOD AND APPARATUS FOR ESTABLISHING GROUP CELL ON BASIS OF MEASUREMENT SIGNAL VARIATION

CROSS-REFERENCE TO RELATED APPLICATIONS

This application is the National Stage filing under 35 U.S.C. 371 of International Application No. PCT/KR2015/005735, filed on Jun. 8, 2015, which claims the benefit of U.S. Provisional Application No. 62/009,307, filed on Jun. 8, 2014, the contents of which are all hereby incorporated by reference herein in their entirety.

BACKGROUND OF THE INVENTION

Field of the Invention

The present invention relates to wireless communications, and more particularly, to a method for establishing a group cell for a cooperative transmission and a handover in a wireless communication system.

Related Art

Since a user equipment (UE) which is a representative mobile device moves, quality of a currently provided service may deteriorate or a cell capable of providing a better service may be detected. Accordingly, the UE may move to a new cell, which is called performing a movement of the UE.

A micro cell, a femto cell, and a pico cell, etc., having a small service coverage may be installed in a specific location within a coverage of a macro cell having a wide coverage. Such a cell may be called a small cell.

A heterogeneous network (HetNet) is a network in which several types of cells overlapping in the same region are simultaneously operated. Recently, since a required data amount of the UE is growing, it becomes difficult to satisfy the required data amount when using only one conventional macro cell. Therefore, a HetNet topology and a small cell concentration architecture are proposed to increase overall network capacity and to improve energy efficiency by allowing a small-scale region to be served using a low-power micro cell, femto cell, pico cell, or the like. A research is underway for this as one of study items of the 3GPP LTE standard. With the ongoing miniaturization and concentration of the cells, there is a growing interest on an inter-cell cooperative transmission technique and a technique for processing a frequent handover of a mobile user.

SUMMARY OF THE INVENTION

An object of the present invention is to improve performance deterioration caused by a frequent handover which occurs when a user equipment (UE) moves between several cells, in particular, concentrated small cells, in a wireless communication system.

In an environment such as a small cell concentrated structure, a more advanced handover scheme than the conventional handover scheme is necessary since there is a high possibility that performance deterioration occurs due to an incorrect handover if a more accurate handover scheme is not introduced. Therefore, the present invention proposes a method of configuring a cooperative cell cluster table so as to be used to perform a handover.

In addition, it is proposed a method in which if it is assumed that an inter-cell cooperative transmission is possible, which cells will be used to effectively perform a cooperative transmission is determined by using a cooperative cell cluster table, and cells determined as being effective configure a cooperative cluster to actually perform a cooperative transmission.

According to one embodiment, provided is a method of performing a cooperative transmission or a handover by a base station in a mobile communication system having a plurality of cells. The method includes receiving a parameter from a terminal, configuring a terminal's neighbor cell information table by using the parameter, and configuring a cooperative cell cluster table by using the terminal's neighbor cell information table.

The method may further include performing the inter-cell cooperative transmission upon satisfying a triggering condition for performing the cooperative transmission on the basis of the cooperative cell cluster table, and may further include performing a handover upon satisfying a triggering condition for performing the handover on the basis of the cooperative cell cluster table.

The parameter may be at least any one of received signal strength indicator (RSSI), reference signal received power (RSRP), and reference signal received quality (RSRQ). The parameter may be received by the base station from the terminal periodically, or may be received by the base station from the terminal when at least any one of the parameter transmitted from the base station to the terminal and the variation of the parameter is changed.

The method may further include updating by the base station the terminal's neighbor cell information table and the cooperative cell cluster table by using the parameter.

The terminal's neighbor cell information table and the cooperative cell cluster table may include at least one of strength of a signal transmitted from the base station to the terminal, a magnitude order of the signal strength, a variation $\Delta r_{x,y}$ of a distance, and a variation $\Delta r^*_{x,y}$ of an extended distance, The triggering condition for performing the handover may be determined by:

$$R_{1,1}{}^n - R_{1,1}{}^s \geq R_{th}{}^{CoMP}(\Delta r_{1,2}).$$

The triggering condition for performing the cooperative transmission may be determined by:

$$R_{1,1}{}^n - R_{1,1}{}^s \geq R_{th}{}^{H/O}(\Delta r_{1,2}, \Delta r_{2,3}).$$

According to another embodiment, provided is an apparatus for performing a cooperative transmission or a handover in a mobile communication system having a plurality of cells. The apparatus includes a memory, a transceiver, and a processor for connecting the memory and the transceiver, wherein the processor is configured for controlling the transceiver to receive a parameter from a terminal, configuring a terminal's neighbor cell information table by using the parameter, and configuring a cooperative cell cluster table by using the terminal's neighbor cell information table.

The processor may perform the inter-cell cooperative transmission upon satisfying a triggering condition for performing the cooperative transmission on the basis of the cooperative cell cluster table. The triggering condition for performing the cooperative transmission may be determined by:

$$R_{1,1}{}^n - R_{1,1}{}^s \geq R_{th}{}^{CoMP}(\Delta r_{1,2}).$$

The processor may perform a handover upon satisfying a triggering condition for performing the handover on the basis of the cooperative cell cluster table. The triggering condition for performing the handover may be determined by:

$$R_{1,1}{}^n - R_{1,1}{}^s \geq R_{th}{}^{H/O}(\Delta r_{1,2}, \Delta r_{2,3}).$$

A frequent handover which occurs when a mobile user equipment (UE) is served in an environment such as a small cell concentrated structure can be more effectively processed, and if an inter-cell cooperative transmission is considered, it may be helpful to select a cooperative base station (BS) for performing a cooperative transmission for each UE.

BRIEF DESCRIPTION OF THE DRAWINGS

FIG. 11 illustrates an example of configuring each UE's neighbor cell information table in the environment of FIG. 10.

FIG. 12 illustrates an example in which a BS actually creates and uses a cooperative cell cluster table by using each UE's neighbor cell information table in an environment where a UE moves.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc, IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
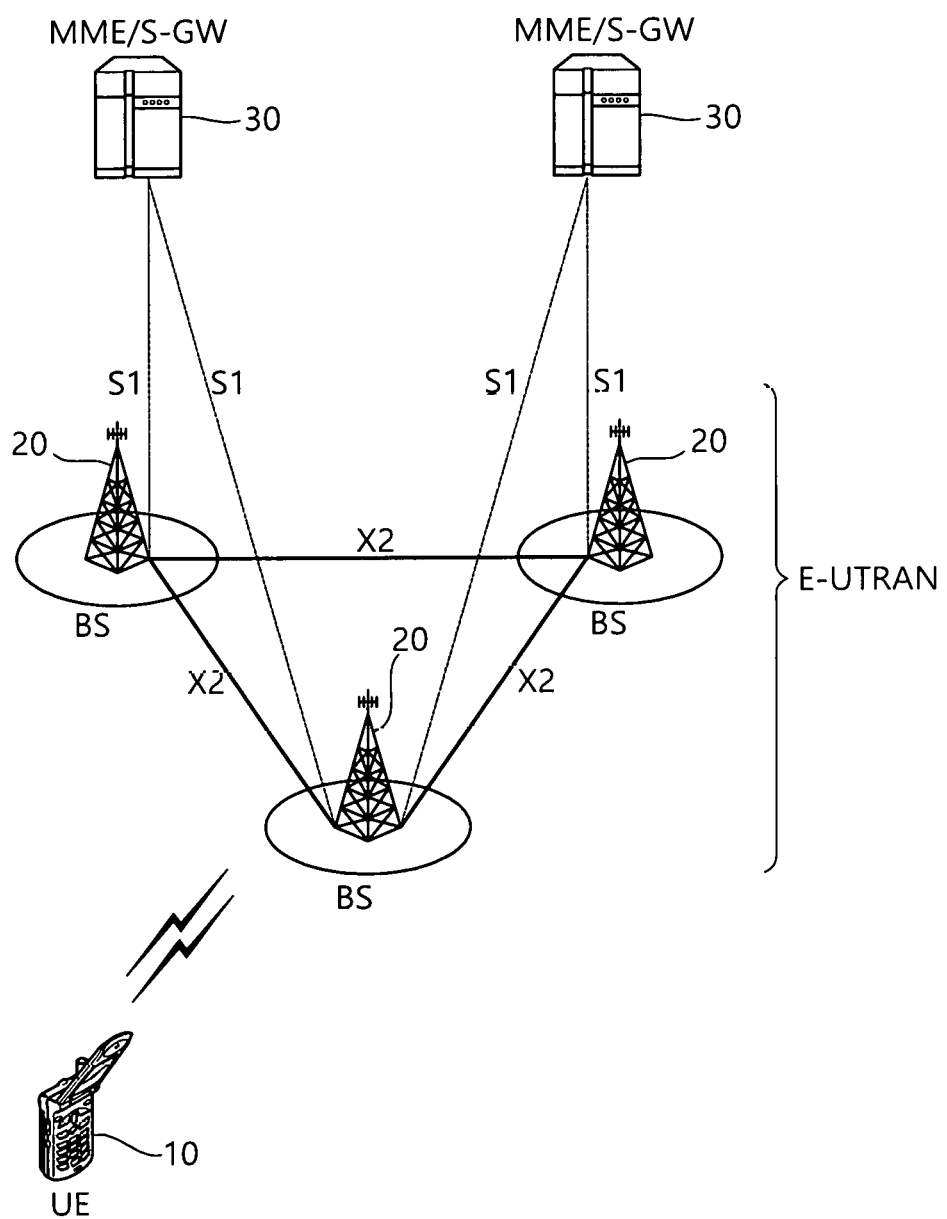
FIG. 1 illustrates a wireless communication system to which the present invention is applied.

FIG. 1 illustrates a wireless communication system to which the present invention is applied. The wireless communication system may be called an evolved-UMTS terrestrial radio access network (E-UTRAN), or a long term evolution (LTE)/LTE-A system.

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), and a wireless device. The BS 20 generally represents a fixed station that communicates with the UE 10 and may be referred to as other terms such as an evolved-NodeB (eNB), a base transceiver system (BTS), and an access point.

The BSs 20 may be connected to each other through an X2 interface. The BS 20 is connected with an evolved packet core (EPC) 30 through an S1 interface, and more particularly, connected with a mobility management entity (MME) through an S 1-MME and a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Layers of a radio interface protocol between the UE and the network may be divided into a first layer L1, a second layer L2, and a third layer L3 based on three lower layers of an open system interconnection (OSI) standard model which is widely known in the communication system, and among them, a physical layer to which the first layer belongs provides an information transfer service using a physical channel, and a radio resource control (RRC) layer positioned on the third layer serves to control a radio resource between the UE and the network. To this end, the RRC layer exchanges an RRC message between the UE and the network.

Figure 2:
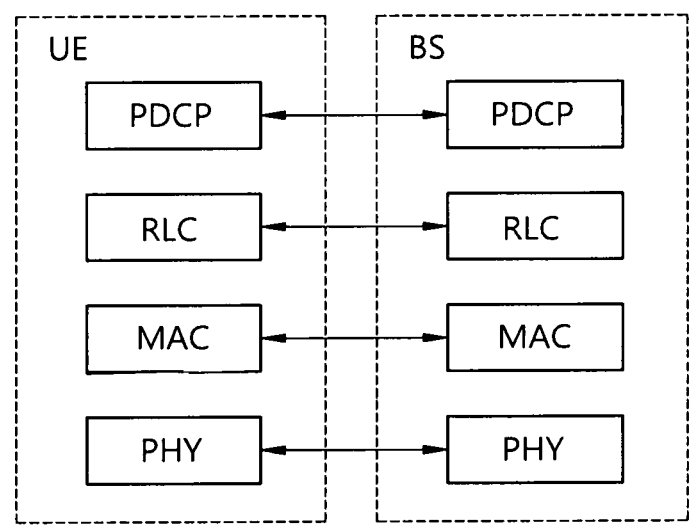
FIG. 2 is a block diagram illustrating a radio protocol architecture for a user plane.
Figure 3:
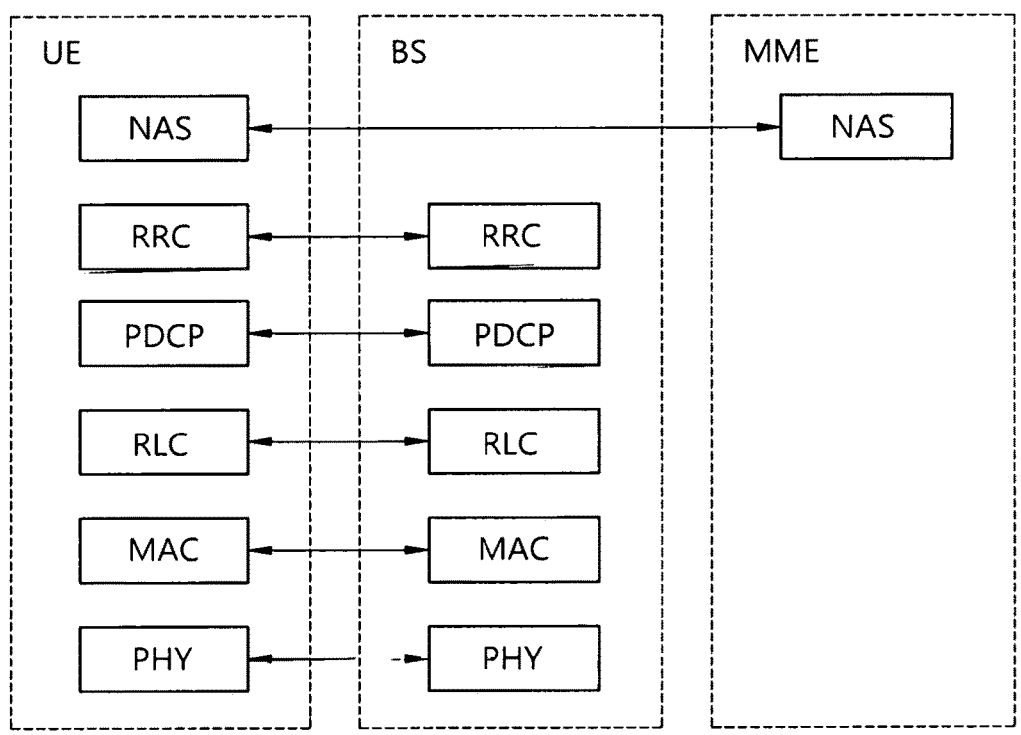
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission, and the control plane is a protocol stack for control signal transmission.

Referring to FIGS. 2 and 3, a physical (PHY) layer provides an information transfer service to an upper layer by using a physical channel. The PHY layer is connected with a medium access control (MAC) layer which is the upper layer through a transport channel. Data move between the MAC layer and the PHY layer through the transport channel. The transport channel is classified according to how the data is transmitted through a radio interface with any characteristic.

The data move between different PHY layers, that is, the PHY layers of the transmitter and the receiver through the physical channel. The physical channel may be modulated by an orthogonal frequency division multiplexing (OFDM) scheme, and use a time and a frequency as the radio resource.

A function of the MAC layer includes mapping between a logical channel and a transport channel and multiplexing/demultiplexing to a transport block provided to the physical channel on the transport channel of a MAC service data unit (SDU) which belongs to the logical channel. The MAC layer provides a service to a radio link control (RLC) layer through the logical channel.

A function of the RLC layer includes concatenation, segmentation, and reassembly of the RLC SDU. In order to secure various quality of services (QoS) required by a radio bearer (RB), an RLC layer provides three operation modes of a transparent mode (TM), an unacknowledged mode (UM), and an acknowledged mode (AM). The AM RLC provides an error correction through an automatic repeat request (ARQ).

The radio resource control (RRC) layer is defined only in the control plane. The RRC layer is related with configuration, re-configuration, and release of the RBs to serve to control the logical channel, the transport channel, and the physical channels. The RB means a logic path provided by a first layer (PHY layer) and a second layer (MAC layer, RLC layer, or PDCP layer) in order to transfer the data between the UE and the network.

A function of a packet data convergence protocol (PDCP) layer in the user plane includes transfer, header compression, and ciphering of the user data. A function of the PDCP layer in the control plane includes transfer and ciphering/integrity protection of control plane data.

The configuration of the RB means a process of defining characteristics of the radio protocol layer and the channel in order to provide a specific service and configuring each detailed parameter and operation method. The RB may be divided into a signaling RB (SRB) and a data RB (DRB) again. The SRB is used as a path for transmitting an RRC message in the control plane, and the DRB is used as a path for transporting user data in the user plane.

When RRC connection is established between the RRC layer of the UE and the RRC layer of the E-UTRAN, the UE is in an RRC connected state, and if not, the UE is in an RRC idle state.

A downlink transport channel for transporting the data to the UE from the network includes a broadcast channel (BCH) for transporting system information and a downlink shared channel (SCH) for transporting user traffic or a control message. The traffic or the control message of a downlink multicast or broadcast service may be transported through the downlink SCH, or may be transported through a separate downlink multicast channel (MCH). Meanwhile, an uplink transport channel for transporting the data from the UE to the network includes a random access channel (RACH) for transporting an initial control message and an uplink shared channel (SCH) for transporting the user traffic or the control message in addition to the RACH.

A logical channel which is above the transport channel and mapped in the transport channel includes a broadcast control channel (BCCH), a paging control channel (PCCH), a common control channel (CCCH), a multicast control channel (MCCH), a multicast traffic channel (MTCH), and the like.

The physical channel is constituted by several OFDM symbols in a time domain and several sub-carriers in a frequency domain. One sub-frame is constituted by a plurality of OFDM symbols in the time domain. The RB as a resource allocation unit is constituted by a plurality of OFDM symbols and a plurality of sub-carriers. Further, each sub-frame may use specific sub-carriers of specific OFDM symbols (for example, first OFDM symbols) of the corresponding sub-frame for the physical downlink control channel (PDCCH), that is, a L1/L2 control channel. A transmission time interval (TTI) is a unit time of sub-frame transmission.

Hereinafter, an RRC state of the UE and an RRC connection method will be described.

The RRC state means whether the RRC layer of the UE is logical-connected with the RRC layer of the E-UTRAN or not, and a case where the RRC layer of the UE is connected with the RRC layer of the E-UTRAN is called a RRC connection state, and a case where the RRC layer of the UE is not connected with the RRC layer of the E-UTRAN is called an RRC idle state. Since the RRC connection exists in the UE in the RRC connection state, the E-UTRAN may determine the existence of the corresponding UE in a cell unit, and as a result, the UE may be efficiently controlled. On the other hand, the UE in the RRC idle state may not be determined by the E-UTRAN, and a core network (CN) is managed by a tracking area unit which is a larger area unit than the cell. That is, in the UE in the RRC idle state, only the existence is determined by a large area unit, and the UE needs to move in the RRC connection state in order to receive a general mobile communication service such as voice or data.

When the user first turns on the power of the UE, the UE first searches a proper cell and then stays in the RRC idle state in the corresponding cell. The UE in the RRC idle state establishes the RRC connection with the E-UTRAN through an RRC connection procedure only when the RRC connection is required, and is transited into the RRC connection state. There are several cases where the UE in the RRC idle state requires the RRC connection, and for example, uplink data transmission is required due to reasons such as user's call attempt, or a response message to a case where a paging message is received from the E-UTRAN is transmitted.

A non-access stratum (NAS) layer positioned above the RRC layer performs functions such as a session management and a mobility management.

In the NAS layer, in order to manage mobility of the UE, two states of EDEPS mobility management-REGISTERED (EMM-REGISTER) and EMM-DEREGISTERED are defined, and the two states are applied to the UE and the MME. The initial UE is in the EMM-DEREGISTERED state, and the UE performs a procedure of registering the UE in the corresponding network through an initial attaching procedure so as to be connected to the network. When the attaching procedure is successfully performed, the UE and the MME are in the EMM-REGISTERED state.

In order to manage signaling connection between the UE and the EPS, two states of an EPS connection management (ECM)-IDLE state and an ECM-CONNECTED state, and the two states are applied to the UE and the MME. When the UE in the ECM-IDLE state is RRC-connected with the E-UTRAN, the corresponding UE becomes in the ECM-CONNECTED state. When the MME in the ECM-IDLE state is S1-connected with the E-UTRAN, the corresponding MME becomes in the ECM-CONNECTED state. When the UE is in the ECM-IDLE state, the E-UTRAN does not have context information of the UE. Accordingly, the UE in the ECM-IDLE state performs a procedure related with the mobility based on the UE such as cell selection or cell reselection without receiving a command of the network. On the contrary, when the UE is in the ECM-CONNECTED state, the mobility of the UE is managed by the command of the network. When a position of the UE in the ECM-IDLE state is different from a position which is known to the network, the UE notifies the corresponding position of the UE to the network through a tracking area updating procedure.

Figure 4:
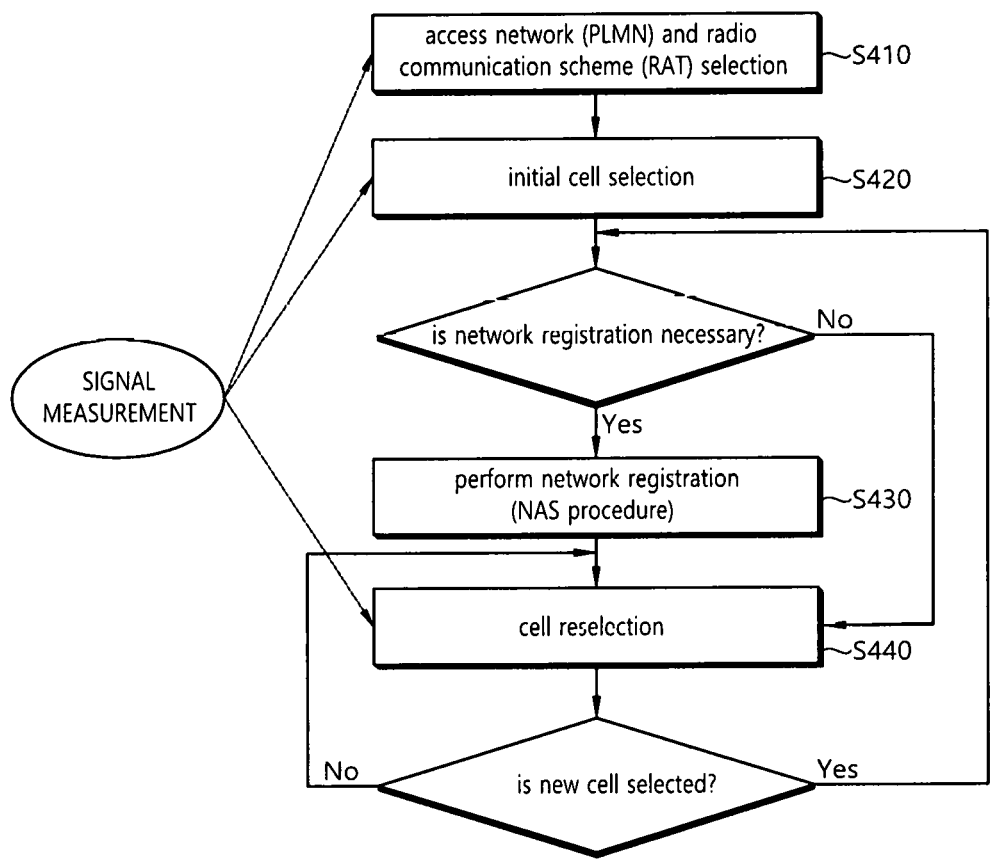
FIG. 4 is a flowchart illustrating an operation of the UE in the RRC idle state.

FIG. 4 is a flowchart illustrating an operation of the UE in the RRC idle state. FIG. 4 illustrates a procedure of registering a UE in which initial power is turned on in the network through a cell selection process and reselecting the cell if necessary.

Referring to FIG. 4, the UE selects a radio access technology (RAT) for communicating with the PLMN which is a network to receive the service (S410). Information on the PLMN and the RAT may be selected by the user of the UE, and stored in a universal subscriber identity module (USIM) to be used.

The UE selects the measuring BS and a cell having largest value among cells in which signal intensities and quality measured from the BS are larger than a predetermined value (Cell Selection) (S420). This is performing the cell selection by the turned-on UE and may be called initial cell selection. The cell selection procedure will be described below. After the cell selection, the UE receives system information which the BS periodically transmits. The aforementioned predetermined value means a value defined in the system for ensuring the quality for the physical signal in the data transmission/reception. Accordingly, the value may vary according to the applied RAT.

The UE performs a network registering procedure in the case where network registering is required (S430). The UE registers self-information (e.g., IMSI) in order to receive a service (e.g., paging) from the network. The UE needs not to be registered in the connected network whenever selecting the cell, but is registered in the network in the case where information (e.g., tracking area identity (TAI)) on the network received from the system information and information on a network which is known to the UE.

The UE performs cell reselection based on a service environment, a UE environment, or the like which is provide by the cell (S440). The UE selects one of other cells providing a better signal characteristic than the cell of the BS to which the UE is connected, when the value of the intensity or the quality of the signal measured from the BS receiving the service is a value measured from the BS of the neighbor cell. This process is distinguished from the initial cell selection of the second process to be called cell re-selection. In this case, in order to prevent the cell from being frequently reselected depending on the change in signal characteristic, there is a temporal constraint. The cell re-selection procedure will be described below.

Figure 5:
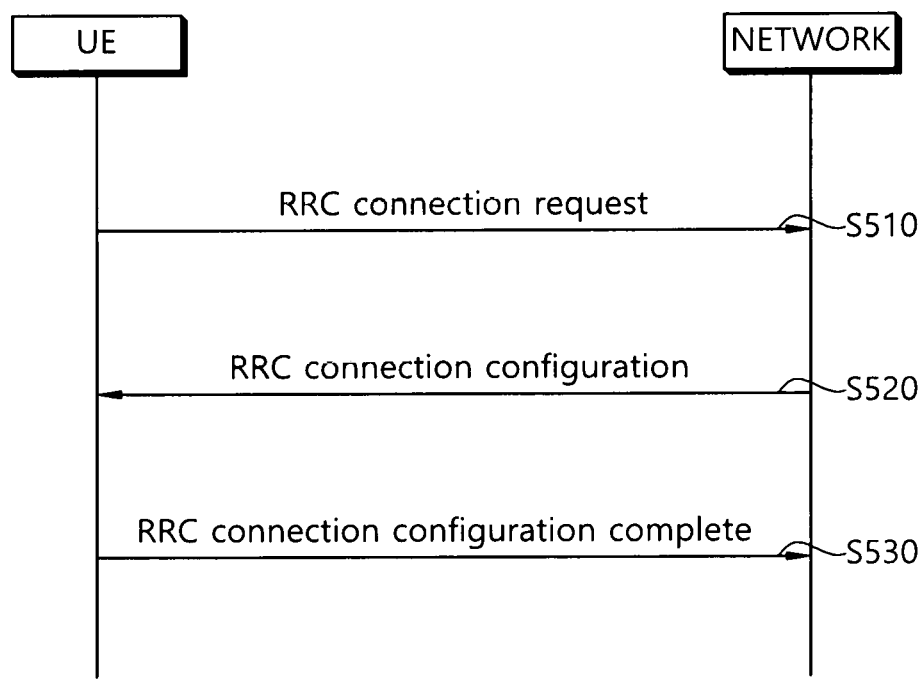
FIG. 5 is a flowchart illustrating a process of establishing RRC connection.

FIG. 5 is a flowchart illustrating a process of establishing RRC connection.

The UE transports an RRC connection request message requesting the RRC connection to the network (S510). The network transports an RRC connection setup message in a response for the RRC connection request (S520). After receiving the RRC connection setup message, the UE enters an RRC connection mode.

The UE transports to the network an RRC connection setup complete message used for verifying successful completion of the RRC connection establishment (S530).

Figure 6:
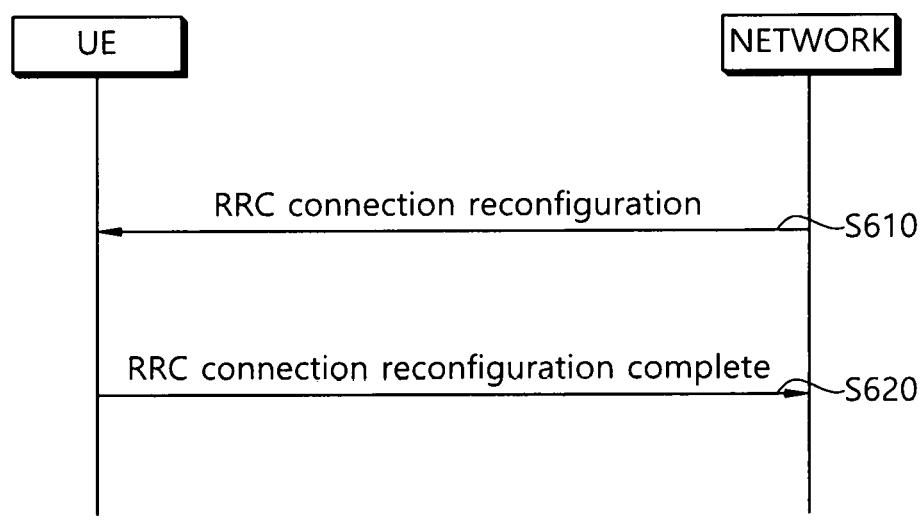
FIG. 6 is a flowchart illustrating an RRC connection reconfiguration process.

FIG. 6 is a flowchart illustrating an RRC connection reconfiguration process. The RRC connection reconfiguration is used for modifying the RRC connection. The RRC connection reconfiguration is used for RB establishment/modify/release, handover performance, and measurement setup/modify/release.

The network transports to the UE an RRC connection reconfiguration message for modifying the RRC connection (S610). The UE transports to the network an RRC connection reconfiguration complete message used for verifying successful completion of the RRC connection reconfiguration, as a response to the RRC connection reconfiguration (S620).

Next, a procedure of selecting the cell by the UE will be described in detail.

When the power is turned on or the UE stays in the cell, the UE performs procedures for receiving the service by selecting/re-selecting a cell having proper quality.

The UE in the RRC idle state selects the cell having the proper quality at all times and needs to be prepared to receive the service through the selected cell. For example, the UE in which the power is just turned on needs to select the cell having the proper quality for registration to the network. When the UE in the RRC connection state enters the RRC idle state, the UE needs to select the cell staying in the RRC idle state. As such, a process of selecting the cell which satisfies any condition so that the UE stays in a service stand-by state such as the RRC idle state is called cell selection. Since the cell selection is performed in a state where the cell in which the UE stays in the RRC idle state is not currently determined, it is more important to select the cell as quickly as possible. Accordingly, so long as the cell is a cell providing radio signal quality of a predetermined level or more, even though the cell is not the cell providing the best signal quality to the UE, the cell may be selected in the cell selection process of the UE.

Hereinafter, with reference to 3GPP TS 36.304 V8.5.0 (2009-03) "User Equipment (UE) procedures in idle mode (Release 8)", a method and a procedure of selecting the cell by the UE in 3GPP LTE will be described in detail.

The cell selection process is largely divided to two processes.

First, as an initial cell selection process, the UE has no previous information on the radio channel in this process. Accordingly, the UE searches all radio channels in order to find a suitable cell. The UE finds the strongest cell in each channel. Thereafter, when the UE just finds the suitable cell stratifying a cell selection reference, the UE selects the corresponding cell.

Next, the UE may select the cell by using the stored information or using information broadcasted in the cell. Accordingly, the cell selection may be quickly performed as compared with the initial cell selection process. The UE selects the corresponding cell when just finding the cell satisfying the cell selection reference. If the UE does not find the suitable cell satisfying the cell selection reference through the process, the UE performs the initial cell selection process.

After the UE selects any cell through the cell selection process, the intensity or the quality of the signal between the UE and the BS may be changed according to mobility of the UE, a change in radio environment, or the like. Accordingly, when the quality of the selected cell deteriorates, the UE may select another cell providing better quality. As such, in the case of selecting the cell again, generally, the UE selects the cell providing better signal quality than the currently selected cell. This process is called cell reselection. The cell reselection process generally has a primary object to select a cell providing the best quality to the UE in terms of the quality of the radio signal.

In addition to the quality of the radio signal, the network determines a priority for each frequency to notify the determined priority to the UE. In the UE receiving the priority, the priority is first considered as compared the radio signal quality reference in the cell reselection process.

As such, there is the method of selecting or reselecting the cell according to a signal characteristic in the radio environment, and in the case of selecting the cell for reselection during the cell reselection, there may be methods of reselecting the cell according to a RAT of the cell and a frequency characteristic below.

Intra-frequency cell reselection: The UE reselects a cell having the same RAT and the same center-frequency as the cell during camping.

Inter-frequency cell reselection: The UE reselects a cell having the same RAT as and a different center-frequency from the cell during camping.

Inter-RAT cell reselection: The UE reselects a cell using a different RAT from the RAT during camping.

A principle of the cell reselection process is as follows.

First, the UE measures the quality of the serving cell and the quality of the neighbor cell for the cell reselection.

Second, the cell reselection is performed based on a cell reselection reference. The cell reselection reference has the following characteristics in association with the measurement of the serving cell and the neighbor cell.

The intra-frequency cell reselection is basically based on ranking. The ranking is an operation of defining index values for evaluating the cell reselection and ranking cells in an order of sizes of the index values by using the index values. A cell having the best index value is commonly called a best ranked cell. The cell index value is based on a value measured by the UE with respect to the corresponding cell and is a value applying a frequency offset or a cell offset if necessary.

The inter-frequency cell reselection is based on a frequency priority provided by the network. The UE attempts to camp on in a frequency having the highest frequency priority. The network may provide a frequency priority to be commonly applied to the UEs in the cell through the broadcast signaling or provide a priority for each frequency for every UE through dedicated signal for each UE. The cell reselection priority provided through the broadcast signaling may be referred to as a common priority, and the cell reselection priority set by the network for each UE may be referred to as a dedicated priority. When the UE receives the dedicated priority, the UE may receive a validity time related with the dedicated priority together. When the UE receives the dedicated priority, the UE starts a validity timer set as the validity time received together. The UE applies the dedicated priority in the RRC idle mode while the validity timer operates. When the validity timer ends, the UE discards the dedicated priority and applies the common priority again.

For the inter-frequency cell reselection, the network may provide parameters (for example, a frequency-specific offset) used in the cell reselection to the UE for each frequency.

For the intra-frequency cell reselection or the inter-frequency cell reselection, the network may provide a neighbor cell list (NCL) used in the cell reselection to the UE. The NCL includes cell-specific parameters (for example, a cell-specific offset) used in the cell reselection.

For the intra-frequency cell reselection or the inter-frequency cell reselection, the network may provide a cell reselection black list used in the cell reselection to the UE. The UE does not perform the cell reselection with respect to the cell included in the black list.

Next, the ranking performed in the cell reselection evaluating process will be described.

A ranking criterion used to give the priority of the cell is defined by Equation 1.

$$R_S = Q_{meas,s} + Q_{hyst}, R_n = Q_{meas,n} - Q_{offset}$$ [Equation 1]

Here, Rs represents a ranking criterion of the serving cell, Rn represents a ranking criterion of the neighbor cell, Qmeas,s represents a quality value measured with respect to the serving cell by the UE, Qmeas,n represents a quality value measured with respect to the neighbor cell by the UE, Qhyst represents a hysteresis value for ranking, and Qoffset represents an offset between the both cells.

In the intra-frequency, when the UE receives the offset Qoffsets,n between the serving cell and the neighbor cell, Qoffset=Qoffsets,n, and when the UE does not receive Qoffsets,n, Qoffset=0.

In the inter-frequency, when the UE receives the offset Qoffsets,n for the corresponding cell, Qoffset=Qoffsets,n+Qfrequency, and when the UE does not receive Qoffsets,n, Qoffset=Qfrequency.

When the ranking criterion Rs of the serving cell and the ranking criterion Rn of the neighbor cell are changed in a similar state, the ranking order is frequently reversed as the changing result, and as a result, the UE may alternately reselect the two cells. Qhyst is a parameter for preventing the UE from alternately reselecting the two cells by giving the hysteresis in the cell reselection.

The UE measures the Rs of the serving cell and the Rn of the neighbor cell according to the Equation 1, regards the cell having the largest ranking criterion value as the highest ranked cell, and selects the cell.

According to the reference, it can be seen that the quality of the cell acts as the most important reference in the cell reselection. When the reselected cell is not the suitable cell, the UE excludes the corresponding frequency or the corresponding cell from the cell reselection target.

Figure 7:
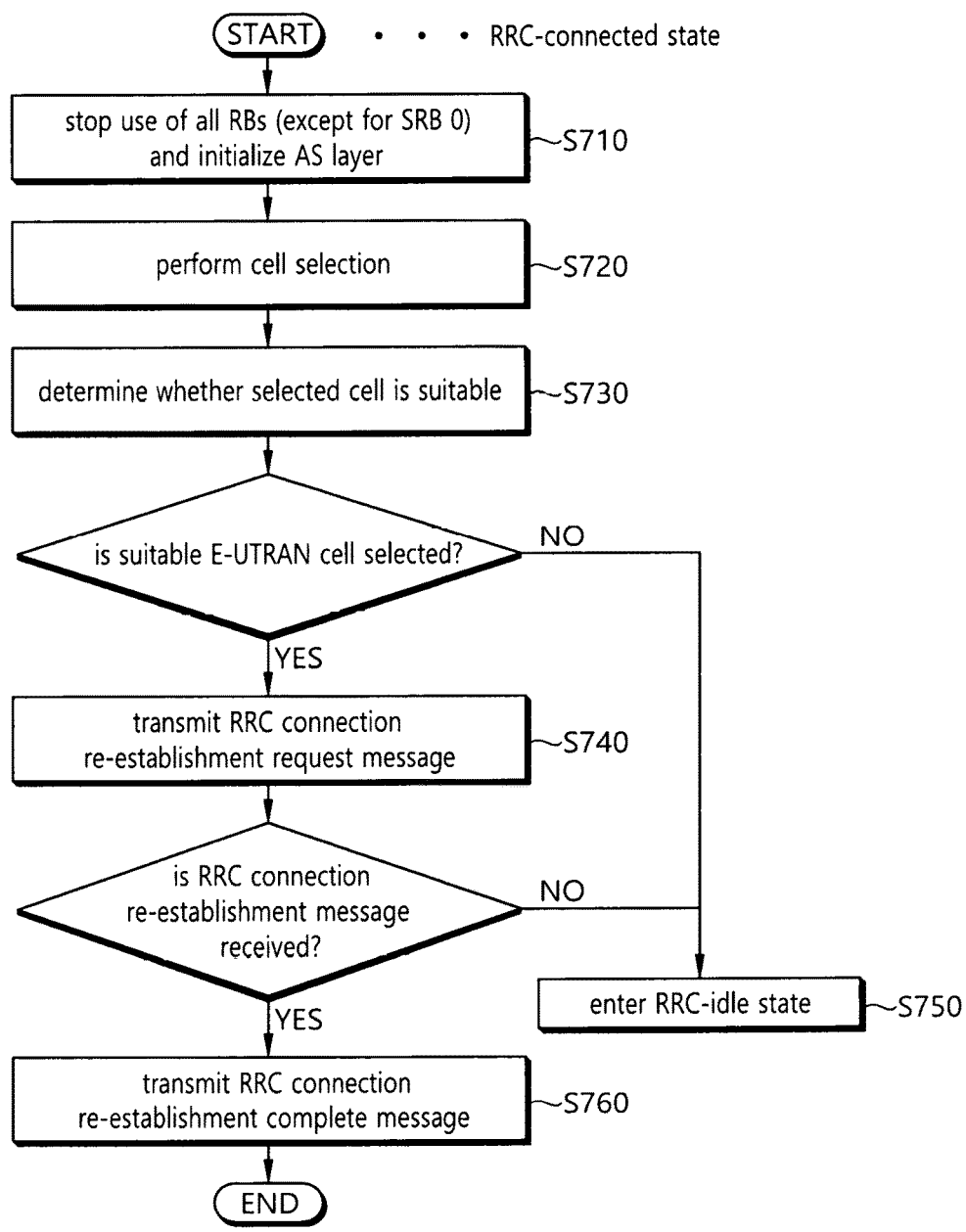
FIG. 7 is a diagram illustrating a RRC connection re-establishment procedure.

FIG. 7 is a diagram illustrating a RRC connection reestablishment procedure.

Referring to FIG. 7, the UE stops the used of all radio bearers which have been set except for signaling radio bearer #0 (SRB 0) and initializes each sub-layer of the AS (S710). Further, each sub-layer and the PHY layer are set as a default configuration. The UE maintains the RRC connection state during such a process.

The UE performs a cell selection procedure for performing the RRC connection reconfiguration procedure (S720). The cell selection procedure in the RRC connection reconfiguration procedure may be performed the same as the cell selection procedure performed in the RRC idle state of the UE even though the UE maintains the RRC connection state.

The UE verifies the system information of the corresponding cell to determine whether the corresponding cell is a suitable cell or not, after performing the cell selection procedure (S730). When it is determined that the selected cell is the suitable E-UTRAN cell, the UE transmits an RRC connection reestablishment request message to the corresponding cell (S740).

Meanwhile, when it is determined that the cell selected through the cell selection procedure for performing the RRC connection reestablishment procedure is the cell using the RAE other than the E-UTRAN, the UE stops the RRC connection reestablishment procedure and enters the RRC idle state (S750).

The UE may be implemented so that the cell selection procedure and the suitability verification of the cell by receiving the system information of the selected cell are finished within a limited time. To this end, the UE may drive a timer according to the starting of the RRC connection reestablishment procedure. The timer may stop when it is determined that the UE selects the suitable cell. When the timer ends, the UE may regard that the RRC connection reestablishment procedure is failed and enter the RRC idle state. The timer is hereinafter referred to as a radio link failure timer. In LTE specification TS 36.331, a timer called T311 may be used as the radio link failure timer. The UE may acquire the setting value of the timer from the system information of the serving cell.

In the case of receiving and accepting the RRC connection reestablishment request message from the UE, the cell transmits a RRC connection reestablishment message to the UE.

The UE receiving the RRC connection reestablishment message from the cell reconfigures the PDCP sub-layer and the RLC sub-layer for the SRB1. Further, the UE calculates various key values related with security setting and reconfigures the PDCP sub-layer responsible for the security with newly calculated security key values. As a result, the SRB 1 between the UE and the cell is opened, and the RRC control message may be transmitted and received. The UE completes the restarting of the SRB1, and transmits to the cell an RRC connection reestablishment complete message that the RRC connection reestablishment procedure is completed (S760).

On the contrary, in the case of receiving and rejecting the RRC connection reestablishment request message from the UE, the cell transmits a RRC connection reestablishment reject message to the UE.

When the RRC connection reestablishment procedure is successfully performed, the cell and the UE perform the RRC connection reestablishment procedure. As a result, the UE restores a state before performing the RRC connection reestablishment procedure and maximally secures continuity of the service.

Figure 8:
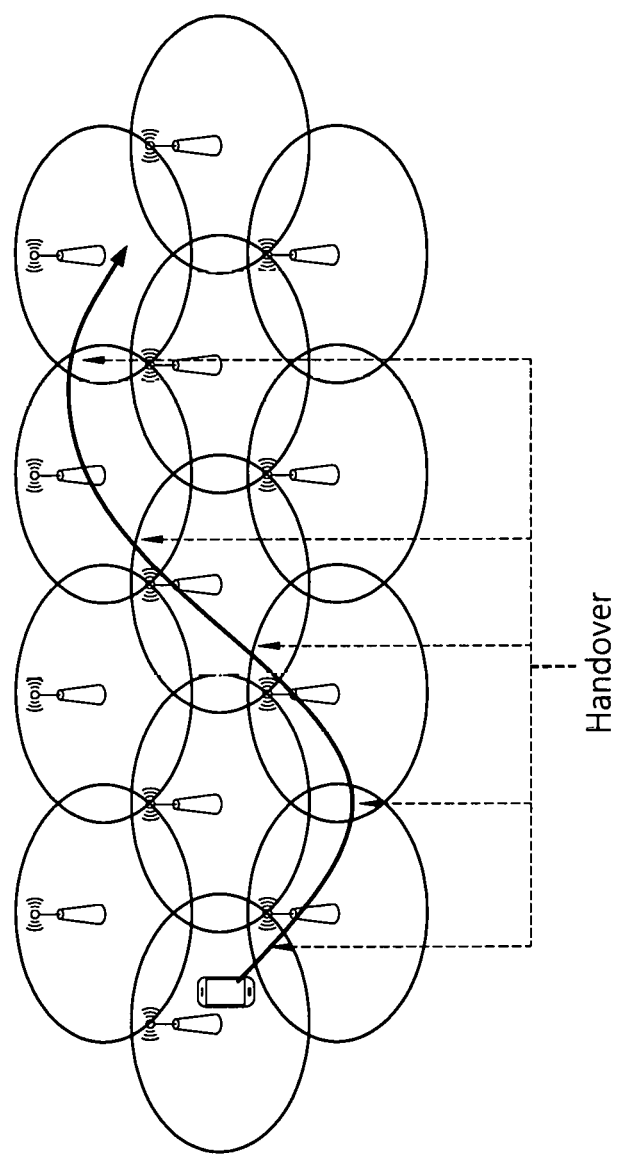
FIG. 8 illustrates a handover problem experienced by a mobile UE while moving in a small-cell concentration environment.

FIG. 8 illustrates an example in which a mobile UE moves in a small-cell concentration environment. Recently, since a required data amount of the UE is growing, it becomes difficult to satisfy the required data amount when using only one conventional macro cell. Therefore, a small-scale region is served using a low-power micro cell, femto cell, pico cell, or the like. In the example of FIG. 8, a handover occurs 5 times when the UE moves due to low-power small cells. Since such a frequent handover leads to performance deterioration, there is a need for a more advanced handover scheme than the conventional handover scheme.

In order to solve the aforementioned problem, the present invention may define a cooperative cell cluster configuration table for each UE so that a UE-centric cooperative cell cluster can be configured for an inter-cell cooperative transmission and a handover when a serving UE moves between cells in an environment where several cells are concentrated, in particular, in an environment where several small cells are concentrated. In order to configure the cooperative cell cluster, not only strength of a signal received by the UE from each cell but also a parameter capable of recognizing a mobility of the UE such as a signal strength variation or the like may be used to create the cooperative cluster configuration table. The signal strength may be any one of received signal strength indicator (RSSI), reference signal received power (RSRP), and reference signal received quality (RSRQ), and the signal strength variation may be any one of ΔRSSI, ΔRSRP, and ΔRSRQ. Although the following description is based on the RSSI and the ΔRSSI for convenience of explanation, the present invention is not limited thereto.

The cooperative cell cluster configuration table may be managed by a BS to which the UE has access. Therefore, the UE may collect information related to the table, and may report necessary parameter values to the accessed BS either periodically or when there is a change in an RSSI value or ΔRSSI or when it is determined that a report to the BS is necessary.

Hereinafter, a method of defining a cooperative cell cluster configuration table is described according to an embodiment of the present invention.

Not only RSSI but also parameters capable of recognizing a mobility of the UE such as an RSSI variation, i.e., ΔRSSI or the like, may be used to create the cooperative cell cluster configuration table. A size of RSSI may be used primarily when the UE selects a cooperative transmission candidate cell or a cooperative transmission cell, and a size of ΔRSSI may be used primarily when the UE selects a handover candidate cell. Since a resource reservation, an interference control, or the like is performed for a handover on the candidate cells determined in this manner, the handover can be performed more effectively and seamlessly. Further, the RSSI and ΔRSSI values may be used complexly when determining a triggering condition for starting a cooperative cell selection and a handover execution.

Figure 9:
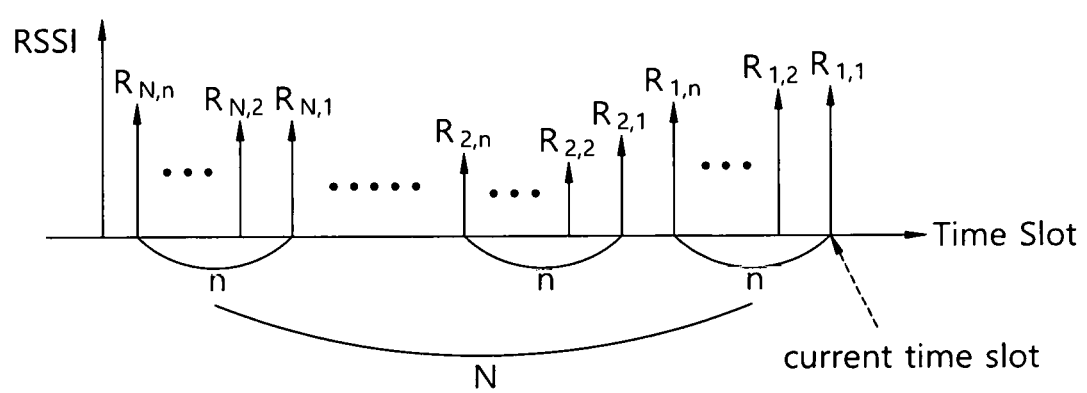
FIG. 9 illustrates a phenomenon in which a size of RSSI received periodically by a UE is changed over time.

FIG. 9 illustrates a phenomenon in which a size of RSSI received periodically by a UE is changed over time. To define ΔRSSI, as shown in FIG. 9, RSSI values are grouped into n groups, and the n groups are defined until the total number thereof becomes N.

$\Delta RSSI_{x,y}$ may be expressed by $\Delta R_{x,y}$, which may be defined by Equation 2.

$$\Delta R_{x,y} = \frac{\sum_{i=1}^{n} R_{x,i}}{n} - \frac{\sum_{i=1}^{n} R_{y,i}}{n} = R_{x,avg} - R_{y,avg} \qquad \text{[Equation 2]}$$

In Equation 2, a first term indicates an average RSSI value of an $x^{th}$ group among the N groups, and a second term indicates an average RSSI value of an $y^{th}$ group among the N groups. $\Delta R_{x,y}$ denotes a value obtained by subtracting the average RSSI value of the $y^{th}$ group from the average RSSI value of the $x^{th}$ group. n denotes a value defined to correct a width of vibration caused by a small scale fading, and N is a value determined according to at which time slot a previous RSSI will be determined with respect to a current average RSSI in consideration of a UE movement speed or the like or how many ΔRSSIs will be used to configure the cooperative cell cluster configuration table. Therefore, the values N and n can be configured according to an environment or a situation or the like such as an average speed, channel state, or the like of a UE in a corresponding region.

A value capable of more precisely indicating a relative distance change between the UE and the BS through the ΔRSSI is defined as Δdistance. Δdistance may be expressed by Δr, and $\Delta distance_{x,y}$ may be expressed by $\Delta r_{x,y}$. $\Delta r_{x,y}$ may be defined by Equation 3.

$$\Delta r_{x,y} = \frac{\Delta R_{x,y}}{R_{x,avg} R_{y,avg}} I\left(\frac{R_{1,avg}}{R_{th}}\right) \quad \text{[Equation 3]}$$

In this case, $R_{th}$ is a threshold of a current RSSI for determining whether to use the value $\Delta r$, and a function $I(m)$ may be defined by Equation 4.

$$I(m) = \begin{cases} 1, & \text{if } m \geq 1 \\ 0, & \text{if } m < 1 \end{cases} \quad \text{[Equation 4]}$$

That is, if a current $R_{1,avg}$ is greater than $R_{th}$, the calculated $\Delta r_{x,y}$ is used, otherwise, $\Delta r_{x,y}$ is set to 0.

Now, it is assumed that $R_{x,avg}$ and $R_{y,avg}$ are expressed respectively by Equation 5 and Equation 6.

$$R^*_{x,avg} \approx \frac{kP}{r_x^{\gamma}} \quad \text{[Equation 5]}$$

$$R_{y,avg} \approx \frac{kP}{r_y^{\gamma}} \quad \text{[Equation 6]}$$

In this case, $\gamma$ is a transmission path loss exponent value, $r_x$ is a distance between the BS and the UE at a time x, $r_y$ is a distance between the BS and the UE at a time y, P is transmit power of the BS, and k is a constant value. If this equation is applied to Equation 3, Equation 3 is expressed by Equation 7.

$$\Delta r_{x,y} \approx \frac{r_y^{\gamma} - r_x^{\gamma}}{kP} I\left(\frac{R_{1,avg}}{R_{th}}\right) \quad \text{[Equation 7]}$$

That is, if $R_{1,avg}$ is greater than a specific value $R_{th}$, $\Delta r_{x,y}$ is a difference between a $\gamma^{th}$ power of the distance between the BS and the UE at the time y and a $\gamma^{th}$ power of the distance between the BS and the UE at the time x. If it is a situation in which the BS can accurately recognize a transmission path loss exponent value of up to the UE to some extent, $\Delta RSSI^*_{x,y}$ may be newly defined as shown in Equation 8.

$$\Delta R^*_{x,y} = \quad \text{[Equation 8]}$$

$$\left(\frac{\sum_{i=1}^{n} R_{x,i}}{n}\right)^{1/\gamma} - \left(\frac{\sum_{i=1}^{n} R_{y,i}}{n}\right)^{1/\gamma} = (R_{x,avg})^{1/\gamma} - (R_{y,avg})^{1/\gamma}$$

In a similar manner, $\Delta r^*_{x,y}$ may be defined by Equation 9.

$$\Delta r^*_{x,y} = \frac{\Delta R^*_{x,y}}{(R_{x,avg})^{1/\gamma}(R_{y,avg})^{1/\gamma}} I\left(\frac{R_{1,avg}}{R_{th}}\right) \quad \text{[Equation 9]}$$

Further, Equation 9 is expressed by Equation 10.

$$\Delta r^*_{x,y} \approx \frac{r_y - r_x}{(kP)^{1/\gamma}} I\left(\frac{R_{1,avg}}{R_{th}}\right). \quad \text{[Equation 10]}$$

That is, if $R_{1,avg}$ is greater than a specific value $R_{th}$, $\Delta r^*_{x,y}$ is a difference between a distance between the BS and the UE at a time y and a distance between the BS and the UE at a time x.

Figure 10:
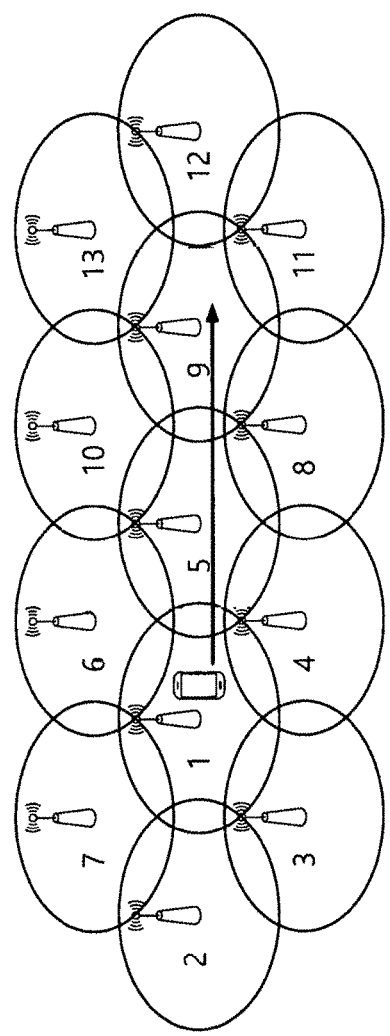
FIG. 10 illustrates an example of an environment where cells are actually deployed.

FIG. 10 illustrates an example in which a UE moves in an environment where cells are actually deployed. It is assumed that the UE receives a service by using a current cell #1 as an anchor cell, and moves towards a cell #9 via a cell #5. A numeric number of each cell is a value randomly determined in the present example to identify a cell.

FIG. 11 illustrates an example of configuring each UE's neighbor cell information table used by a BS to create each UE's cooperative cell cluster table in the environment of FIG. 10 according to an embodiment of the present invention.

A $1^{st}$ column of an upper portion of the table includes a cell number of an anchor cell to which a UE currently has access to receive a service. In the present example, since the UE receives a service by accessing a cell #1 at present, the cell #1 is included in the $1^{st}$ column of the upper portion.

A $1^{st}$ column of a middle portion of the table includes a cell number in a descending order of RSSI received by the UE from each cell. A size of RSSI may be used primarily when the UE selects a candidate cell for performing a cooperative transmission or may be used to select a cell for performing a cooperative transmission. In the present example, since it is assumed that the UE receives a service by accessing the cell #1 and thus RSSI of the cell #1 is the greatest, followed by RSSI of the cell #5 and RSSI of the cell #4, the cells #1, #5, and #4 are included in the $1^{st}$ column of the middle portion in an orderly manner. Although it is assumed in the present example that the number of cells to be listed in an order of the RSSI size is 3, this is for exemplary purposes only, and the present invention is not limited thereto.

A $1^{st}$ column of a lower portion of the table includes a cell number in a descending order of $\Delta$distance ($\Delta r$) received by the UE from each cell. A size of $\Delta$distance ($\Delta r$) may be used primarily when the UE selects a candidate cell for performing a handover, and by performing a resource reservation, an interference control, or the like for the handover on the candidate cells determined in this manner, the handover can be performed more effectively and seamlessly. By reference, if $\Delta$distance$_{1,2}$($\Delta r_{1,2}$) is a positive value, it means that the greater the absolute value, the faster the UE approaches close to the BS, and if $\Delta$distance$_{1,2}$ ($\Delta r_{1,2}$) is a negative value, it means that the greater the absolute value, the faster the UE is separated far from the BS. In the present example, it is assumed that the UE is moving from the cell #1 to the cell #9 via the cell #5, and $\Delta r_{1,2}$ is decreased in the order of the cell #5, the cell #9, and the cell #8. Therefore, the $1^{st}$ column of the lower portion includes the cells #5, #9, and #8 in an orderly manner. Although it is assumed in the present example that the number of cells listed in an order of the size of $\Delta$distance$_{1,2}$($\Delta r_{1,2}$) is 3, this is for exemplary purposes only, and the present invention is not limited thereto.

A $2^{nd}$ column of the table includes an actual RSSI value of each cell, and a $3^{rd}$ column of the table includes a value $\Delta r_{1,2}$, and a $4^{th}$ column of the table includes a value $\Delta r_{2,3}$ of each cell. When a plurality of values $\Delta r$ are used in this manner, up to acceleration information of the UE can be known, and if the acceleration information is necessary, two or more values $\Delta r$ may be used.

FIG. 12 illustrates an example of actually creating and using a cooperative cell cluster table by using each UE's neighbor cell information table configured in FIG. 11 when a UE moves as shown in the example of FIG. 10.

A 1$^{st}$ group of the cooperative cell cluster table may include a cell for serving a corresponding UE at present as an anchor cell. In the present example, since the anchor cell is a cell #1, the cell #1 is included in a 1$^{st}$ group of the cooperative cell cluster table.

A 2$^{nd}$ group of the cooperative cell cluster table may include 'a' cells in a descending order of RSSI except for the anchor cell as neighbor cells. The neighbor cells are a set of candidate cells for performing a cooperative transmission together with the anchor cell or cells used for the cooperative transmission. If the value a is set to 1 in the present example, since the RSSI size is the greatest in the cell #5 other than the anchor cell in FIG. 11, the cell #5 is included in the 2$^{nd}$ group of the cooperative cell cluster table. If the value a is set to 2, the cell #5 and the cell #4 may be included in the 2$^{nd}$ group of the cooperative cell cluster table.

A 3$^{rd}$ group of the cooperative cell cluster table may include 'b' cells in a descending order of Δr(Δdistance) except for the anchor cell and neighbor cells as handover candidate cells. The handover candidate cells are used when the UE selects candidate cells for performing a handover at a later time. Since a resource reservation, an interference control, or the like is performed for a handover on the candidate cells determined in this manner, the handover can be performed more effectively and seamlessly. If the value b is set to 1 in the present example, since the size of Δr is greatest in FIG. 11 other than the cell #5 as the neighbor cell, the cell #9 is included in the 3$^{rd}$ group of the cooperative cell cluster table. If the value b is set to 2, the cell #9 and the cell #8 may be included in the 3$^{rd}$ group of the cooperative cell cluster table. That is, the values a and b are variables that can be configured depending on an environment, a situation, or the like.

In the present invention, the cooperative cell cluster configuration table may also include not only a cell number of each cell but also an actual RSSI value and a value Δr(Δdistance) of cells corresponding to the present number. Accordingly, each value is confirmed to determine whether a condition for actually performing a cooperative transmission and a handover is satisfied, and if it is determined that a reference condition is satisfied, the cooperative transmission or handover operation starts. First, a triggering condition for performing a cooperative transmission may be defined by Equation 11 below.

$$R_{1,1}^n - R_{1,1}^s \geq R_{th}^{CoMP}(\Delta r_{1,2}) \quad \text{[Equation 11]}$$

Herein, $R^n_{1,1}$ is a current RSSI value of a neighbor cell, and $R^s_{1,1}$ is an RSSI value of a serving cell, i.e., an anchor cell. $\Delta r_{1,2}$ is a relative distance variation of the UE and the BS, and more particularly, a value defined in Equation 3 and Equation 7. Further, a threshold may be defined by Equation 12.

$$R_{th}^{CoMP}(\Delta r_{1,2}) = \alpha_1 - \alpha_2 \Delta r_{1,2} \quad \text{[Equation 12]}$$

Herein, α1, α2 are positive constants, and $\Delta r_{1,2}$ is a relative distance variation of the UE and the BS. That is, the greater the speed at which the UE approaches close to a target cell, the smaller the triggering RSSI value of the cooperative transmission. Therefore, the cooperative transmission procedure can start much earlier.

Next, the triggering condition for performing the handover may be defined by Equation 13.

$$R_{1,1}^n + Ofn + Ocn - Hys \geq R_{1,1}^s + Ofs + Ocs + R_{th}^{H/O}(\Delta r_{1,2}, \Delta r_{2,3}) \quad \text{[Equation 13]}$$

In this case, $R^n_{1,1}$ is a current RSSI value of a neighbor cell, $R^s_{1,1}$ is an RSSI value of a serving cell, i.e., an anchor cell, and $\Delta r_{1,2}, \Delta r_{2,3}$ are relative distance variations between the UE and the BS. Further, each parameter is defined as shown in Table 1.

TABLE 1

| Symbol | Definition |
|---|---|
| Hys | Hysteresis parameter for A3 event |
| Ofn | Frequency specific offset of the frequency of the neighbor cell |
| Ocn | Cell specific offset of the neighbor cell |
| Ofs | Frequency specific offset of the frequency of the serving cell |
| Ocs | Cell specific offset of the serving cell |

In this case, a threshold of RSSI may be defined by Equation 14.

$$R_{th}^{H/O}(\Delta r_{1,2}, \Delta r_{2,3}) = \beta_1 - \beta_2 \Delta r_{1,2} - \beta_3 (\Delta r_{1,2} - \Delta r_{2,3}) \quad \text{[Equation 14]}$$

In this case, $\beta_1$, $\beta_2$, $\beta_3$ are positive constants, and $\Delta r_{1,2}$, $\Delta r_{2,3}$ are relative distance variations between the UE and the BS, and more particularly, values defined in Equation 3 and Equation 6. That is, the greater the speed at which the UE approaches close to a target cell, and the greater the acceleration at which the UE approaches close to the target cell, the smaller the triggering RSSI value of the cooperative transmission. Therefore, the handover procedure can start much earlier.

Figure 13:
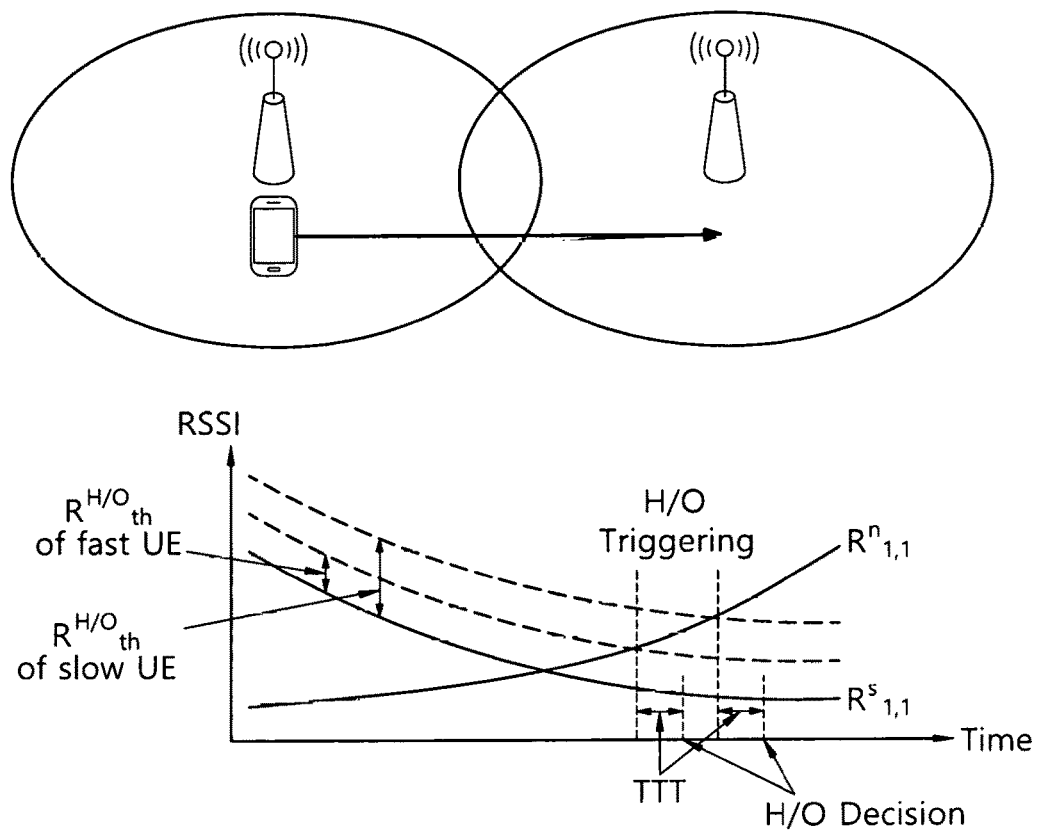
FIG. 13 illustrates that a time of actually triggering a handover varies depending on a UE speed.

FIG. 13 illustrates that a time of actually triggering a handover varies depending on a UE speed. In this case, if it is assumed that a time-to trigger (TTT) value is a value based on a UE movement speed and acceleration, a more adaptive handover operation is possible.

Figure 14:
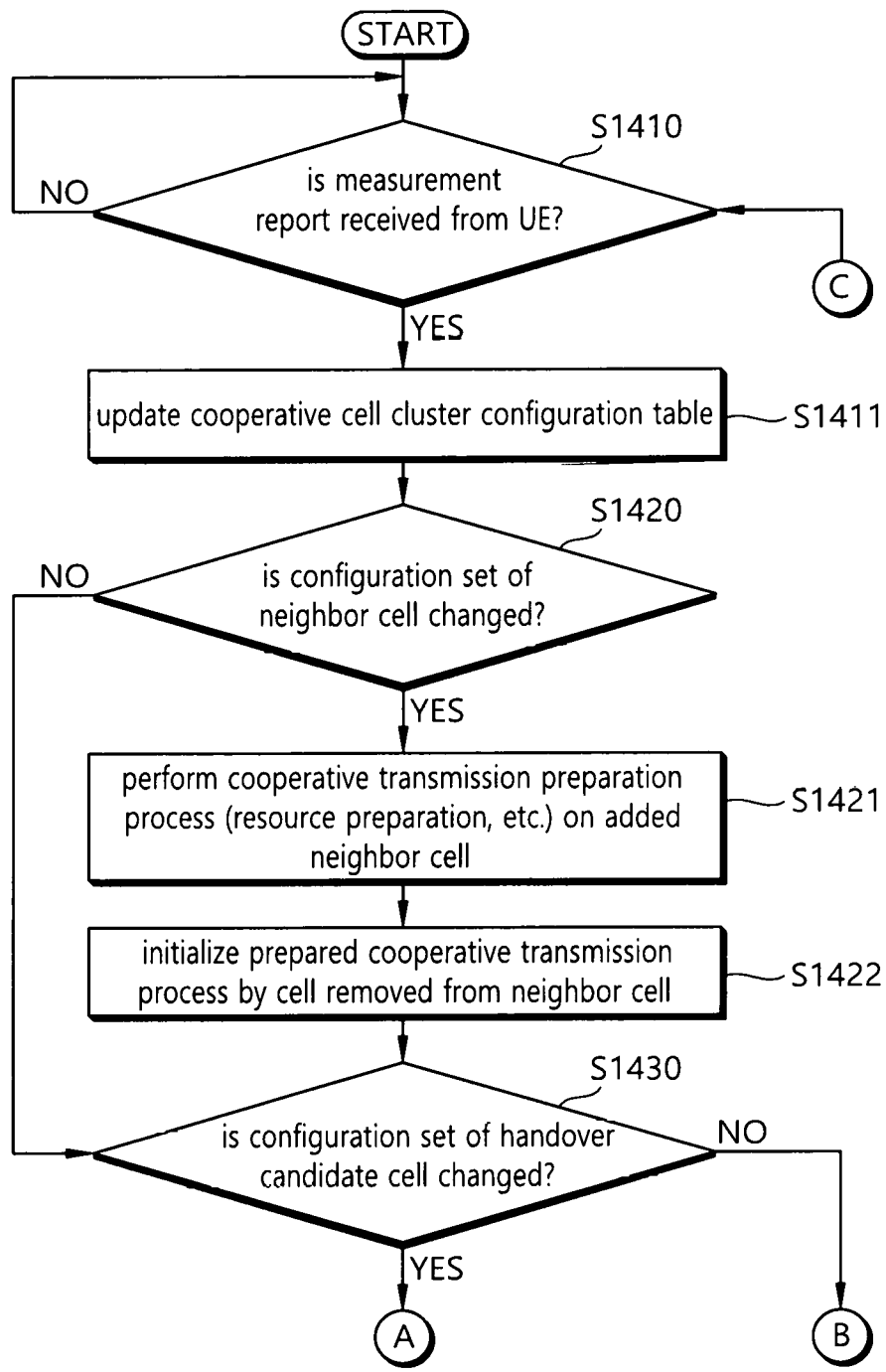
FIG. 14 and FIG. 15 are flowcharts illustrating an example in which a BS performs a cooperative transmission and a handover while receiving each parameter from a UE and updating a cooperative cell cluster configuration table.
Figure 15:
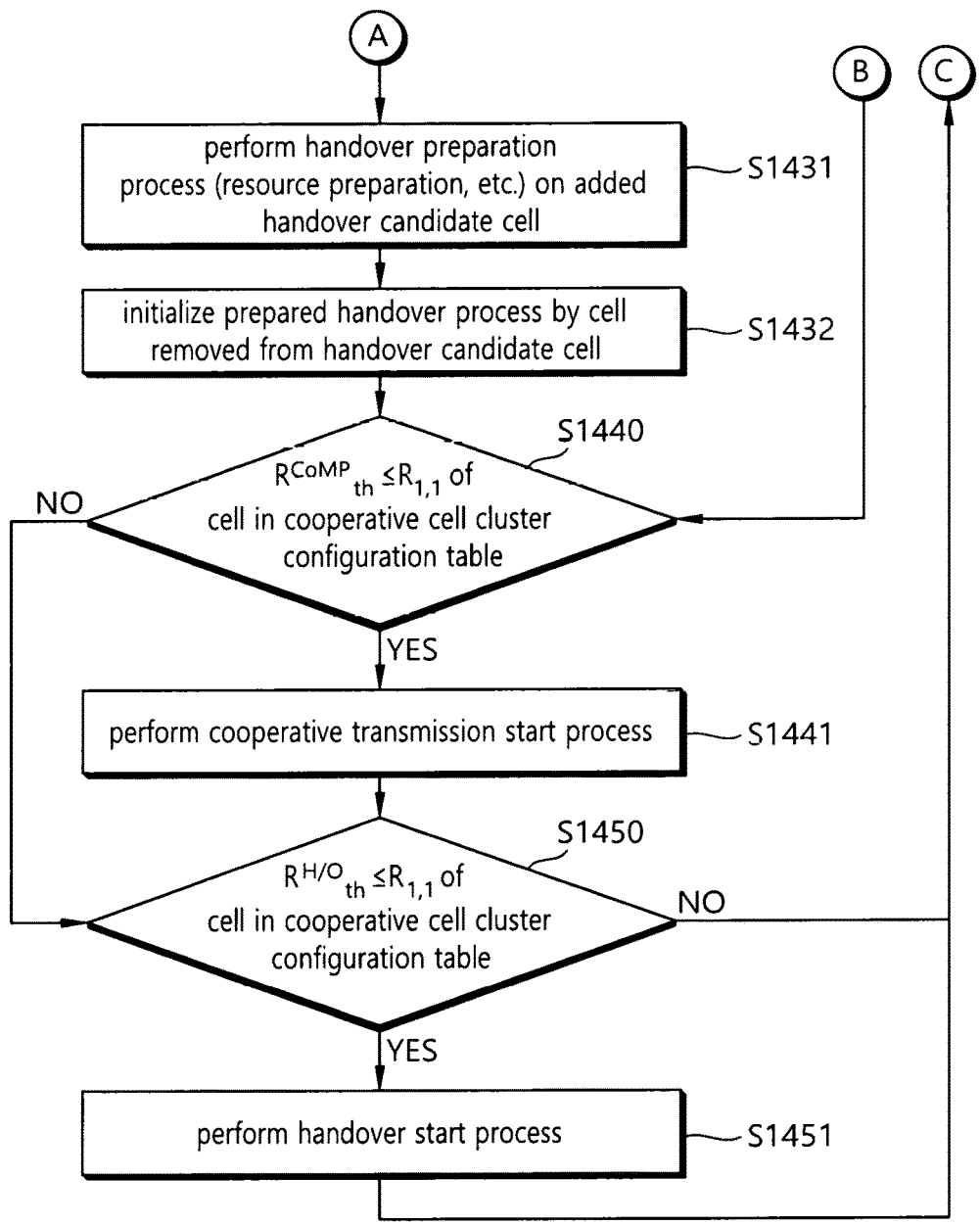

FIG. 14 and FIG. 15 are flowcharts illustrating an example in which a BS actually performs a cooperative transmission and a handover while receiving each parameter reported from a UE and updating a cooperative cell cluster configuration table. In this case, a preparation process of the cooperative transmission and the handover is a process of receiving information regarding a UE and pre-reserving a resource in a target cell, and it is assumed in the present example that the two preparation processes are the same.

Referring to FIG. 14 and FIG. 15, the BS determines whether a measurement report is received from the UE (S1410). If the measurement report is received from the UE, the BS updates a cooperative cell cluster configuration table (S1411).

The BS determines whether a configuration set of a neighbor cell is changed on the basis of the updated cooperative cell cluster configuration table (S1420). If the configuration set of the neighbor cell is changed, a cooperative transmission is prepared to be performed on a neighbor cell added to the cooperative cell cluster configuration table (S1421), and a neighbor cell removed from the cooperative cell cluster configuration table to which it previously belongs initializes a prepared cooperative transmission process (S1422). If the configuration set of the neighbor cell is not changed, the cooperative transmission prepared previously with the neighbor cell is effective.

Next, the BS determines whether a configuration set of a handover candidate cell is changed on the basis of the updated cooperative cell cluster configuration table (S1430). If the configuration set of the handover candidate cell is changed, a preparation for a handover is performed with respect to a handover candidate cell added to the cooperative cell cluster configuration table (a resource reservation, an interference control, etc.) (S1431), and a cell removed from the cooperative cell cluster configuration table to which it previously belongs initializes a prepared handover process (S1432). Through the process (S1431), the handover may be performed more effectively and seamlessly. If the configuration set of the handover candidate cell is not changed, the previous handover candidate cell is effective.

Through the above process (S1410, S1411, S1420, S1421, S1422, S1430, S1431, S1432), a preparation for a cooperative transmission with respect to a neighbor cell and a preparation for a handover with respect to a handover are complete on the basis of the cooperative cell cluster configuration table. Whether to perform the cooperative transmission and the handover process must be determined on the basis of a value of the cooperative cell cluster configuration table, which will be described below in detail.

If the conditions of Equations 11 and 12 are satisfied, that is, if a triggering condition for performing a cooperative transmission is satisfied (S1440), the BS starts the cooperative transmission (S1441). If the triggering condition for performing the cooperative transmission is not satisfied (S1440), the cooperative transmission is not performed, and subsequent steps are performed.

If the conditions of Equations 13 and 14 are satisfied, that is, if a triggering condition for performing a handover is satisfied (S1450), the BS performs the handover (S1451). If the triggering condition for performing the handover is not satisfied (S1450), the handover is not performed.

Thereafter, the BS maintains a cooperative cell cluster configuration table until a measurement report is received again from the UE, and if a new measurement report is transmitted (S1410), repeats the above steps S1410 to S1451. The new measurement report may be periodically transmitted by the UE to the BS, and may be transmitted by the UE to the BS upon satisfying a specific condition such as a change in a received signal strength indicator (RSSI) size or an RSSI variation ($\Delta$RSSI) or the like.

Figure 16:
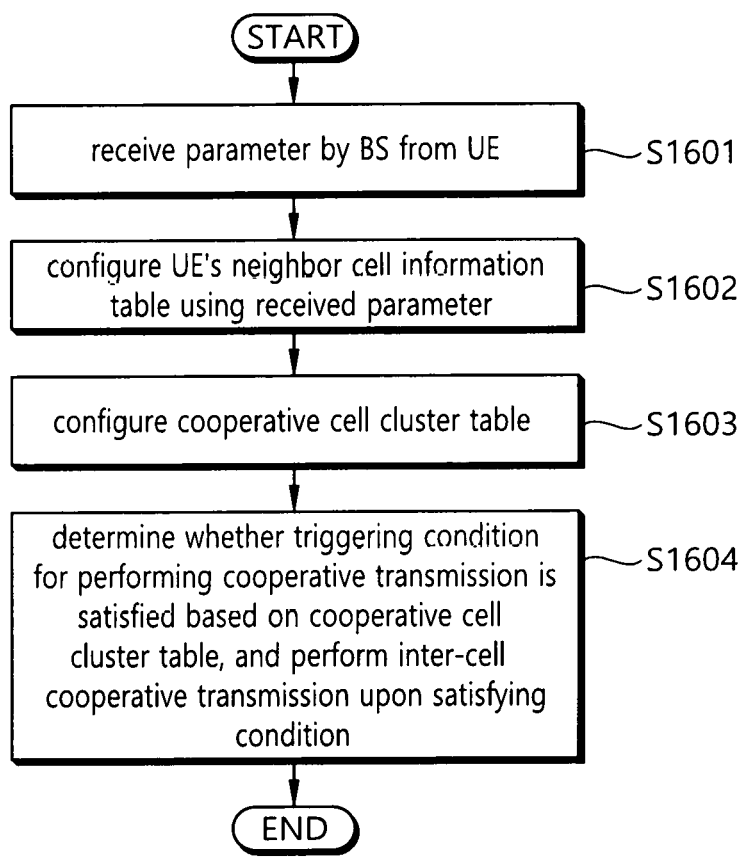
FIG. 16 is a block diagram illustrating a method of performing a cooperative transmission on the basis of a cooperative cell cluster table according to an embodiment of the present invention.

FIG. 16 is a block diagram illustrating a method of performing a cooperative transmission on the basis of a cooperative cell cluster table according to an embodiment of the present invention.

Referring to FIG. 16, a BS receives a parameter from a UE (S1601). The parameter may be any one of received signal strength indicator (RSSI), reference signal received power (RSRP), and reference signal received quality (RSRQ). The BS configures a UE's neighbor cell information table by using the received parameter (S1602), and configures a cooperative cell cluster table by using the UE's neighbor cell information table (S1603). The BS determines whether a triggering condition for performing a cooperative transmission is satisfied on the basis of the cooperative cell cluster table, and if the triggering condition for performing the cooperative transmission is satisfied, performs an inter-cell cooperative transmission (S1604).

Figure 17:
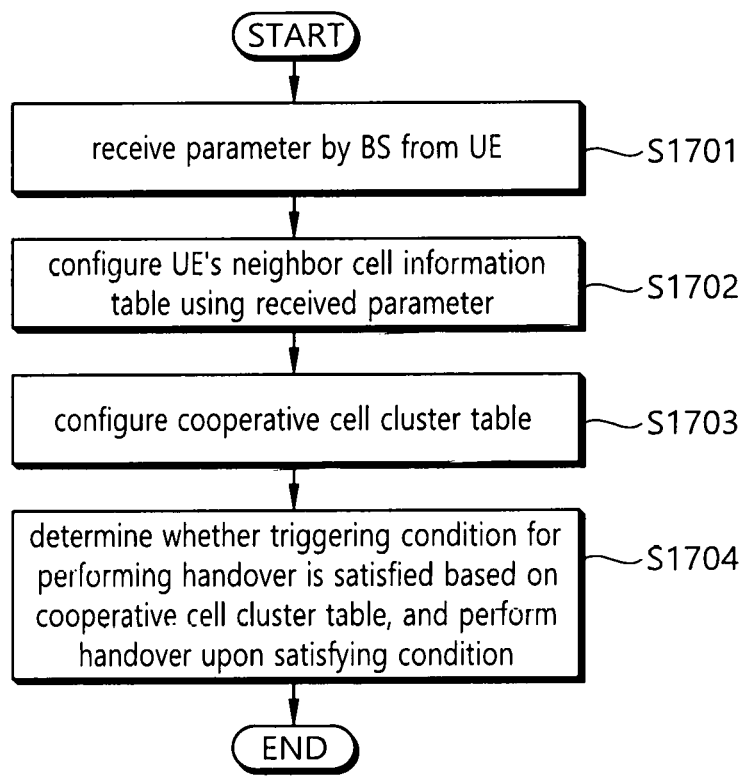
FIG. 17 is a block diagram illustrating a method of performing a handover on the basis of a cooperative cell cluster table according to an embodiment of the present invention.

FIG. 17 is a block diagram illustrating a method of performing a handover on the basis of a cooperative cell cluster table according to an embodiment of the present invention.

Referring to FIG. 17, a BS receives a parameter from a UE (S1701). The parameter may be any one of received signal strength indicator (RSSI), reference signal received power (RSRP), and reference signal received quality (RSRQ). The BS configures a UE's neighbor cell information table by using the received parameter (S1702), and configures a cooperative cell cluster table by using the UE's neighbor cell information table (S1703). The BS determines whether a triggering condition for performing a handover is satisfied on the basis of the cooperative cell cluster table, and if the triggering condition for performing the handover is satisfied, performs the handover (S1704).

Figure 18:
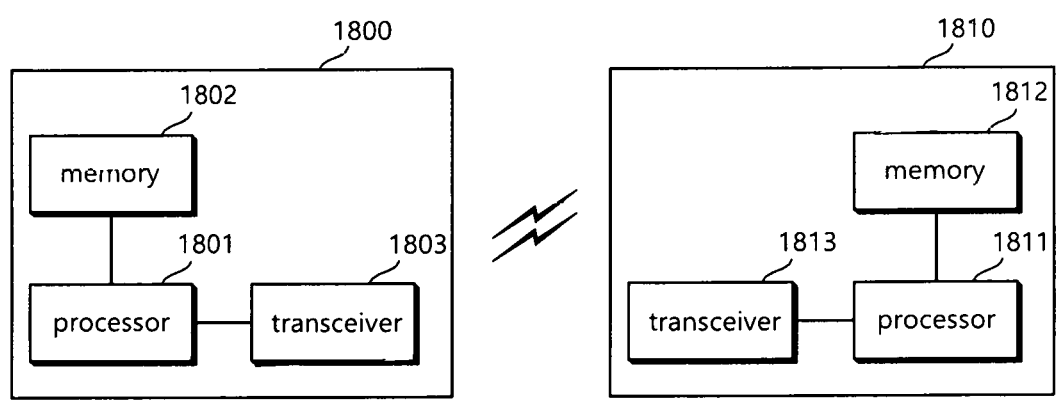
FIG. 18 is a block diagram illustrating a wireless communication system according to the embodiment of the present invention.

FIG. 18 is a block diagram illustrating a wireless communication system according to the embodiment of the present invention.

A BS 1800 includes a processor 1801, a memory 1802 and a transceiver 1803. The memory 1802 is connected to the processor 1801, and stores various information for driving the processor 1801. The transceiver 1803 is connected to the processor 1801, and transmits and/or receives radio signals. The processor 1801 implements proposed functions, processes and/or methods. In the above embodiment, an operation of the base station may be implemented by the processor 1801.

A UE 1810 includes a processor 1811, a memory 1812 and a transceiver 1813. The memory 1812 is connected to the processor 1811, and stores various information for driving the processor 1811. The transceiver 1813 is connected to the processor 1811, and transmits and/or receives radio signals. The processor 1811 implements proposed functions, processes and/or methods. In the above embodiment, an operation of the base station may be implemented by the processor 1811.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method of performing a cooperative transmission or a handover by a base station in a mobile communication system having a plurality of cells, the method comprising:

receiving a parameter from a terminal;

configuring a terminal's neighbor cell information table by using the parameter; and configuring a cooperative cell cluster table by using the terminal's neighbor cell information table, wherein the terminal's neighbor cell information table and the cooperative cell cluster table comprise at least one of strength of a signal transmitted from the base station to the terminal, a magnitude order of the signal strength, a variation $\Delta r_{x,y}$ of a distance, and a variation $\Delta r^*_{x,y}$ of an extended distance, wherein the signal strength comprises at least any one of received signal strength indicator (RSSI), reference signal received power (RSRP), or reference signal received quality (RSRQ), wherein the variation of the distance is a relative variation of a distance calculated by measuring strength of an average signal between an $x^{th}$ group and a $y^{th}$ group among N signal strength groups, and wherein the variation of the extended distance is a modified value of the relative variation of the distance calculated by measuring the strength of the average signal between the $x^{th}$ group and the $y^{th}$ group among the N signal strength groups.

2. The method of claim 1, wherein the parameter is at least any one of the RSSI, RSRP, or RSRQ.

3. The method of claim 1, further comprising:
configuring the terminal's neighbor cell information table by using a variation of the parameter, wherein the variation of the parameter comprises at least any one of $\Delta$RSSI, $\Delta$RSRP, or $\Delta$RSRQ.

4. The method of claim 1, wherein the parameter is received by the base station from the terminal periodically, or is received by the base station from the terminal when at least any one of the parameter transmitted from the base station to the terminal and the variation of the parameter is changed.

5. The method of claim 1, further comprising:
updating, by the base station, the terminal's neighbor cell information table and the cooperative cell cluster table by using the parameter.

6. The method of claim 1, wherein the variation $\Delta r_{x,y}$ of the distance is determined by:

$$\Delta r_{x,y} = \frac{\Delta R_{x,y}}{R_{x,avg} R_{y,avg}} I\left(\frac{R_{1,avg}}{R_{th}}\right) \approx \frac{r_y^\gamma - r_x^\gamma}{kP} I\left(\frac{R_{1,avg}}{R_{th}}\right),$$

where $R_{x,avg}$ is a signal strength average value of the $x^{th}$ group among the N signal strength groups, $R_{y,avg}$ is a signal strength average value of the $y^{th}$ group among the N signal strength groups, $\Delta R_{x,y} = R_{x,avg} - R_{y,avg}$, $I(m) = \{1 \text{ if } m \geq 1, 0 \text{ if } m < 1\}$, $R_{th}$ is a threshold of current signal strength for determining whether to use $\Delta r_{x,y}$, $\gamma$ is a transmission path loss exponent value, $r_x$ is a distance between the base station and the terminal at a time x, $r_y$ is a distance between the base station and the terminal at a time y, P is transmit power of the base station, and k is a constant.

7. The method of claim 1, wherein the variation $\Delta r^*_{x,y}$ of the extended distance is determined by:

$$\Delta r^*_{x,y} = \frac{\Delta R^*_{x,y}}{(R_{x,avg})^{1/\gamma}(R_{y,avg})^{1/\gamma}} I\left(\frac{R_{1,avg}}{R_{th}}\right) \approx \frac{r_y - r_x}{(kP)^{1/\gamma}} I\left(\frac{R_{1,avg}}{R_{th}}\right)$$

where $R_{x,avg}$ is a signal strength average value of the $x^{th}$ group among the N signal strength groups, $R_{y,avg}$ is a signal strength average value of the $y^{th}$ group among the N signal strength groups, $\Delta R^*_{x,y} = (R_{x,avg})^{1/\gamma} - (R_{y,avg})^{1/\gamma}$, $I(m) = \{1 \text{ if } m \geq 1, 0 \text{ if } m < 1\}$, $R_{th}$ is a threshold of current signal strength for determining whether to use $\Delta r^*_{x,y}$, $\gamma$ is a transmission path loss exponent value, $r_x$ is a distance between the base station and the terminal at a time x, $r_y$ is a distance between the base station and the terminal at a time y, P is transmit power of the base station, and k is a constant.

8. The method of claim 1, further comprising:
performing the inter-cell cooperative transmission upon satisfying a triggering condition for performing the cooperative transmission on the basis of the cooperative cell cluster table.

9. The method of claim 8, wherein the triggering condition for performing the cooperative transmission is determined by:

$$R_{1,1}^n - R_{1,1}^s \geq R_{th}^{CoMP}(\Delta r_{1,2})$$

where $R^n_{1,1}$ is current signal strength of a neighbor cell, $R^s_{1,1}$ is current signal strength of a serving cell, $R_{th}^{CoMP}(\Delta r_{1,2}) = \alpha_1 - \alpha_2 \Delta r_{1,2}$, $\Delta r_{1,2}$ is a relative variation of a distance calculated by measuring average signal strength between a $1^{st}$ group and a $2^{nd}$ group among the N signal strength groups, and $\alpha_1$ and $\alpha_2$ are positive constants.

10. The method of claim 1, further comprising:
performing the handover upon satisfying a triggering condition for performing the handover on the basis of the cooperative cell cluster table.

11. The method of claim 10, wherein the triggering condition for performing the handover is determined by:

$$R_{1,1}^n - R_{1,1}^s \geq R_{th}^{H/O}(\Delta r_{1,2}, \Delta r_{2,3}),$$

where $R^n_{1,1}$ is current signal strength of a neighbor cell, $R^s_{1,1}$ is current signal strength of a serving cell, $R_{th}^{H/O}(\Delta r_{1,2}, \Delta r_{2,3}) = \beta_1 - \beta_2 \Delta r_{1,2} - \beta_3(\Delta r_{1,2} - \Delta r_{2,3})$, $\Delta r_{x,y}$ is a relative variation of a distance calculated by measuring average signal strength between an $x^{th}$ group and a $y^{th}$ group among the N signal strength groups, and $\beta_1$, $\beta_2$, and $\beta_3$ are positive constants.

12. An apparatus for performing a cooperative transmission or a handover in a mobile communication system having a plurality of cells, the apparatus comprising:
a memory;
a transceiver; and
a processor for connecting the memory and the transceiver, wherein the processor is configured for:
controlling the transceiver to receive a parameter from a terminal;
configuring a terminal's neighbor cell information table by using the parameter; and
configuring a cooperative cell cluster table by using the terminal's neighbor cell information table,
wherein the terminal's neighbor cell information table and the cooperative cell cluster table comprise at least one of strength of a signal transmitted from the base station to the terminal, a magnitude order of the signal strength a variation $\Delta r_{x,y}$ of a distance, and a variation $\Delta r^*_{x,y}$ of an extended distance,
wherein the signal strength comprises at least any one of received signal strength indicator (RSSI), reference signal received power (RSRP), or reference signal received quality (RSRQ),
wherein the variation of the distance is a relative variation of a distance calculated by measuring strength of an average signal between an $x^{th}$ group and a $y^{th}$ group among N signal strength groups, and wherein the variation of the extended distance is a modified value of the relative variation of the distance calculated by measuring the strength of the average signal between the $x^{th}$ group and the $y^{th}$ group among the N signal strength groups.

13. The apparatus of claim 12,
wherein the processor is configured for performing the inter-cell cooperative transmission upon satisfying a triggering condition for performing the cooperative transmission on the basis of the cooperative cell cluster table, and
wherein the triggering condition for performing the cooperative transmission is determined by:

$$R_{1,1}^n - R_{1,1}^s \geq R_{th}^{CoMP}(\Delta r_{1,2})$$

where $R^n_{1,1}$ is current signal strength of a neighbor cell, $R^s_{1,1}$ is current signal strength of a serving cell, $R_{th}^{CoMP}(\Delta r_{1,2}) = \alpha_1 - \alpha_2 \Delta r_{1,2}$, $\Delta r_{1,2}$ is a relative variation of a distance calculated by measuring average signal strength between a $1^{st}$ group and a $2^{nd}$ group among the N signal strength groups, and $\alpha_1$ and $\alpha_2$ are positive constants.

14. The apparatus of claim 12,
wherein the processor is configured for performing the handover upon satisfying a triggering condition for performing the handover on the basis of the cooperative cell cluster table, and
wherein the triggering condition for performing the handover is determined by:

$$R_{1,1}^n - R_{1,1}^s \geq R_{th}^{H/O}(\Delta r_{1,2}, \Delta r_{2,3}),$$

where $R^n_{1,1}$ is current signal strength of a neighbor cell, $R^s_{1,1}$ is current signal strength of a serving cell, $R_{th}^{H/O}(\Delta r_{1,2}, \Delta r_{2,3}) = \beta_1 - \beta_2 \Delta r_{1,2} - \beta_3(\Delta r_{1,2} - \Delta r_{2,3})$, $\Delta r_{x,y}$ is a relative variation of a distance calculated by measuring average signal strength between an $x^{th}$ group and a $y^{th}$ group among the N signal strength groups, and $\beta_1$, $\beta_2$, and $\beta_3$ are positive constants.

\* \* \* \* \*